March 8, 1966  H. L. CROSWHITE ETAL  3,239,037

HYDROKINETIC POWER TRANSMISSION WITH FLEXIBLE CLUTCH PISTON

Filed Feb. 17, 1964  3 Sheets-Sheet 1

INVENTORS:
HOWARD L. CROSWHITE
BY PO-LUNG LIANG
ATTORNEYS.

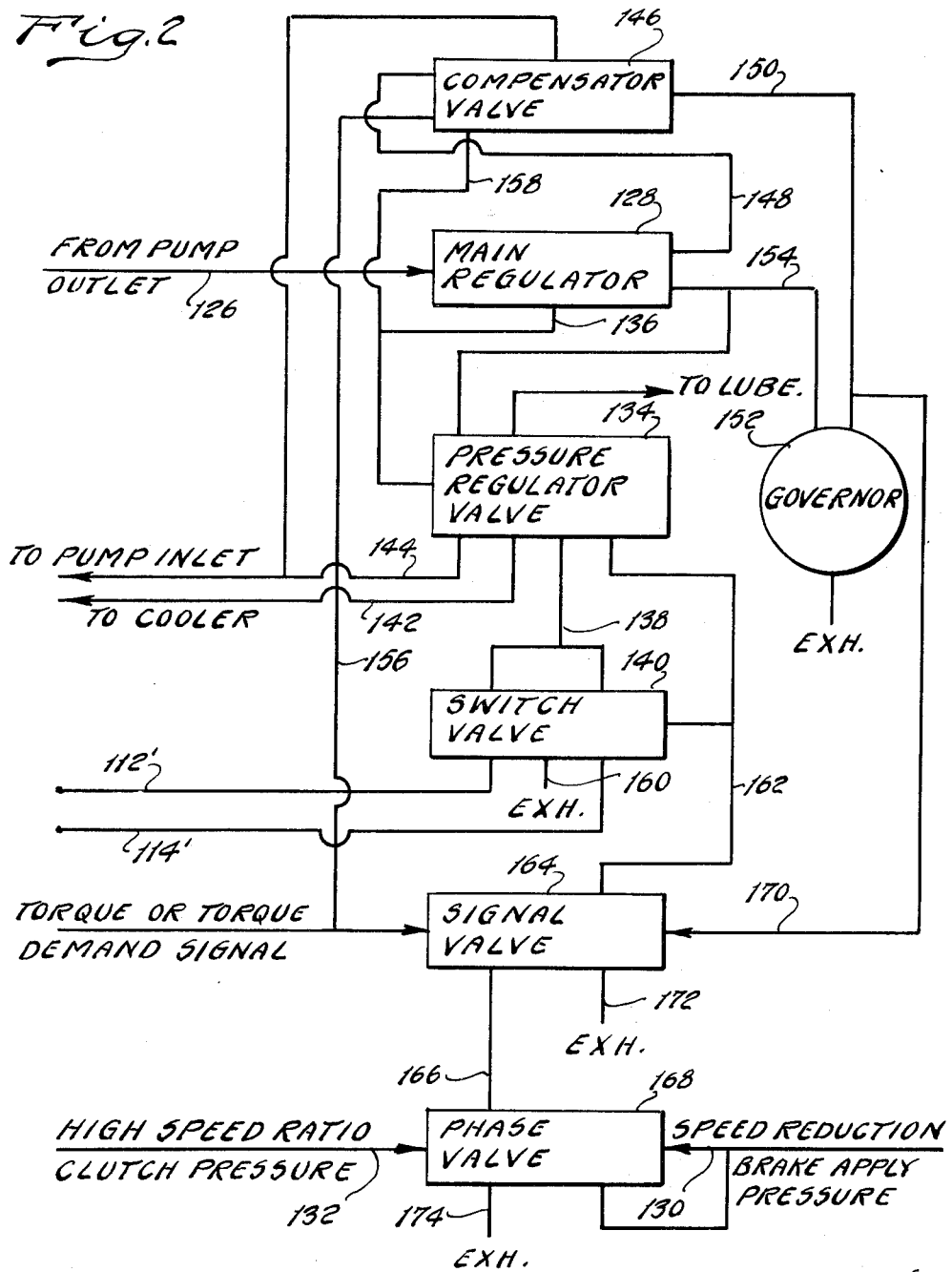

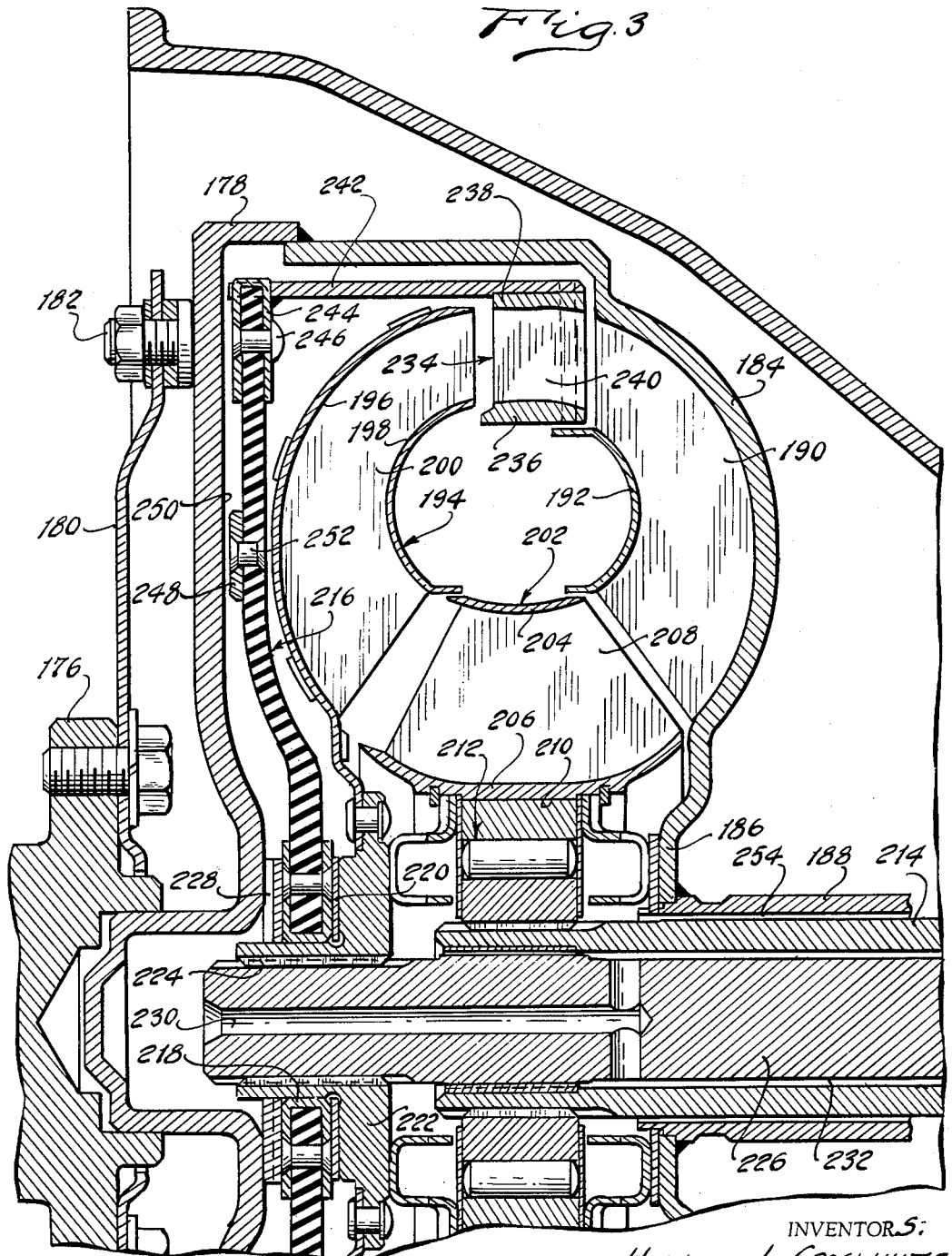

United States Patent Office 3,239,037
Patented Mar. 8, 1966

3,239,037
HYDROKINETIC POWER TRANSMISSION WITH FLEXIBLE CLUTCH PISTON
Howard L. Croswhite, Livonia, and Po-lung Liang, Lincoln Park, Mich., assignors to Ford Motor Company, Dearborn, Mich., a corporation of Delaware
Filed Feb. 17, 1964, Ser. No. 345,337
8 Claims. (Cl. 192—3.2)

Our invention relates to power transmission mechanisms adapted especially for use in automotive vehicle drive-lines, and more particularly to a hydrokinetic power transmission mechanism having a bladed hydrokinetic impeller situated in toroidal fluid flow relationship with other hydrokinetic members in a common torus circuit wherein provision is made for clutching selectively one of the other members to the impeller to modify the torque delivery characteristics of the mechanism.

In a hydrokinetic power transmission mechanism of this type the hydrokinetic unit is supplied with fluid from a pressure source, and provision is made for maintaining a continuous circulation of fluid through the torus circuit of the hydrokinetic unit. This is done to maintain a proper pressure level in the torus circuit and also to allow for dissipation of heat that is developed by the hydrokinetic unit during torque delivery. In each of the two disclosed embodiments of our invention the static pressure that is maintained in the torus circuit of the hydrokinetic unit is utilized to engage a friction clutch that connects together the impeller with another member of the unit. In one embodiment the clutch locks together the turbine and the impeller to establish a mechanical torque delivery path from the driving member to a turbine driven member, the driving member of course being connected to the impeller. In a second embodiment the clutch is used to connect an auxiliary bladed member to the impeller thereby altering the effective blade geometry of the impeller. The hydrokinetic unit of this second embodiment thus can be conditioned for operation in each of two performance ranges.

In each instance, the forces created by the static pressure in the torus circuit of the hydrokinetic unit are triggered by reversing the direction of the fluid flow path followed by the converter fluid as it traverses the torus circuit. When the fluid is fed through one fluid flow passage and returned through another fluid flow passage, a pressure balance exists across the piston member of the clutch structure so that the effective clutch applying force is eliminated. As the fluid flow direction is reversed, however, a pressure unbalance is created across the piston member of the clutch structure thereby causing it to engage.

In the mechanisms disclosed in the pending applications of Martin G. Gabriel, Serial Nos. 235,413 and 247,222 and in the pending application of Norman T. General, Po-lung Liang and Robert P. Zundel, Serial No. 259,272, this reversible flow clutch engaging feature is utilized. Reference may be had to these applications for the purpose of supplementing this disclosure. This disclosure is distinguishable from the other disclosures, however, by the provision of a pressure operated clutch piston construction in the form of a yieldable diaphragm that may be supported at its hub upon a torque transmitting member held axially fast with respect to the rotary portions of the hydrokinetic unit. A friction clutch surface is carried by the radially outward portion of the diaphragm and it may be shifted axially into clutching engagement with a companion friction surface carried by the impeller as the diaphragm is caused to flex under the influence of the pressure forces. The diaphragm thus becomes a torque delivery member.

In a first embodiment of our invention, the diaphragm functions as a torsional vibration dampener that eliminates the need for using a relatively expensive and space consuming drive plate and damper spring assembly of the type normally found in a clutch.

The provision of a clutch arrangement of this type being a principal object of our invention, it is a further object of our invention to provide a torque delivery clutch structure for use with a hydrokinetic unit for clutching together two members of the unit wherein provision is made for absorbing torsional vibration thereby cushioning the transition from one operating range to another.

In the copending Gabriel applications, the axial shifting movement of the friction surface of the clutch structure is accomplished by employing sliding splines or keyways between the movable piston portion of the clutch structure and the member upon which it is supported. In our improved construction, this sliding action is not necessary since the inherent flexibility of the diaphragm portion of the clutch structure accommodates axial shifting movement of the friction surfaces. This greatly simplifies the construction, reduces cost and improves the reliability of the mechanism. The provision of a clutch structure having these characteristics is a further object of our invention.

It is a further object of our invention to provide a clutch structure of the type set forth in the preceding objects wherein clutch applying pressure forces may be established in response to a flow reversal in the torus feed and return passages for the converter unit.

Further objects and features of our invention will become apparent from the following description and from the accompanying drawings, wherein:

FIGURE 2 shows a cross-sectional view that is similar to that of FIGURE 1 although the clutch structure of FIGURE 2 is employed for clutching together an auxiliary impeller member to the main impeller of the hydrokinetic torque converter unit; and FIGURE 3 is a schematic diagram of the control valve system for controlling the direction of flow of fluid through the torque converter of FIGURE 1.

Figure 1:
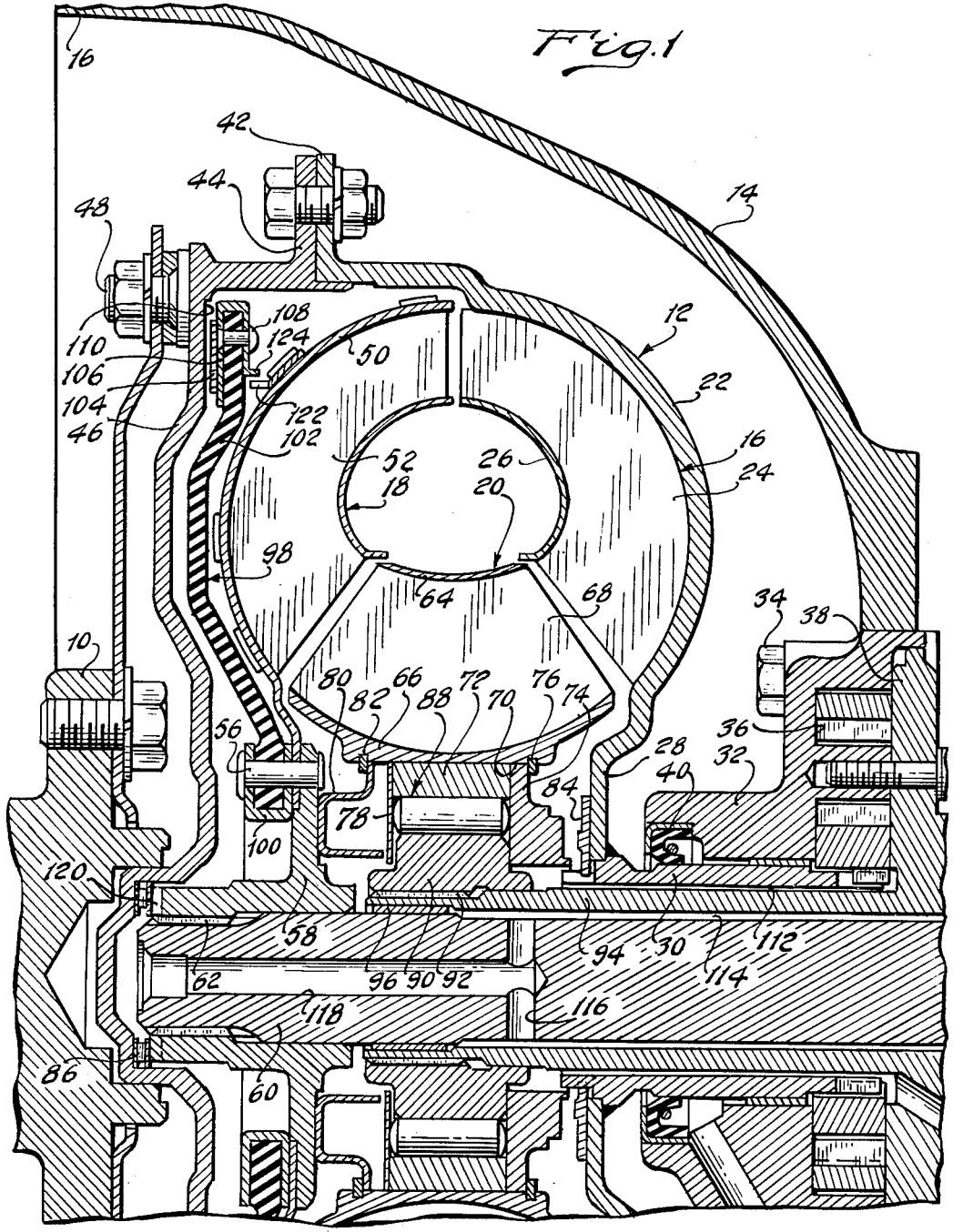
FIGURE 1 shows in longitudinal cross-sectional form a hydrokinetic torque converter employing a lock-up clutch mechanism having the characteristics of our invention.

Referring first to FIGURE 1, numeral 10 designates a portion of a crankshaft of an internal combustion vehicle engine. A hydrokinetic torque converter unit is indicated generally by reference character 12. It is enclosed within a torque converter housing 14 that forms a part of a transmission housing. The outer periphery 16 of housing 14 can be bolted to the engine block of the vehicle engine is known fashion.

Converter unit 12 includes an impeller 16, a turbine 18 and a stator 20. The impeller 16 includes an outer impeller shell 22 which is formed with a generally toroidal shape. Radial outflow blades 24 are carried by the inner surface of the shell 22 in circumferentially spaced relationship. The inner margins of the blades 24 are secured to an annular inner shroud ring 26.

The hub 28 of the shell 22 is connected drivably to a sleeve shaft 30 which in turn is journaled for rotation within the supporting wall 32. The wall is bolted by means of bolts 34 to the transmission housing.

Wall 32 defines a pump cavity 36 within which are situated positive displacement pumping elements. The cavity 36 is closed by means of the closure plate 38 and it may be secured by means of the bolts 34 to a wall 32.

Fluid seal 40 surrounds sleeve shaft 30. The end of sleeve shaft 30 is keyed to the power input element of the positive displacement pump so that the pump is effective to develop pressure whenever the impeller shell 22 is rotating.

The outer periphery of shell 22 is flanged, as shown at 42, to permit a bolted connection with a flange 44 carried by a radially extending shell part 46. A drive plate, not shown, may be used for connecting drivably the crankshaft 10 to the outer periphery of the shell part 46. Suitable threaded studs 48 are provided for this purpose.

Turbine 18 includes an outer shroud 50, an inner shroud 52 and radial inflow blades 54 that are situated between the shrouds in circumferentially spaced relationship. The hub of shroud 50 is secured by rivets 56 to a turbine hub 58. A turbine shaft 60 is splined at 62 to the hub 58.

The stator 20 includes a first shroud 64, a second shroud 66, and stator blades 68 that are positioned in angularly spaced relationship about the axis of shaft 60. Shroud 66 defines a hub formed with an opening 70 within which is positioned an outer overrunning brake race 72. Keys or splines may be used for holding the race 72 rotatably fast within the opening 70. A spacer element 74 is situated on one side of the race 72 and it is held axially fast against the adjacent end of the race 72 by snap ring 76. A bearing disc 78 is located on the other side of the race 72, and it is held against axial shifting movement by means of the spacer element 80. A snap ring 82 holds the spacer element 80 axially fast within the opening 70.

Spacer element 74 functions as a thrust transmitting member and it cooperates with a thrust washer 84 situated adjacent the hub 28 of the shell part 22. In a similar fashion, spacer element 80 functions as a thrust transmitting element as it engages hub 58 for the turbine 18. A radial needle bearing thrust washer 86 may be positioned between the hub 58 and the adjacent hub portion of the shell part 46.

The overrunning brake of which race 72 forms a part is indicated generally by reference character 88. It includes also an inner race 90 that is splined at 92 to a stationary sleeve shaft 94 supported by or formed integrally with the closure plate 38. A bushing 96 between sleeve shaft 94 and shaft 60 supports the latter rotatably.

The bladed passages of the impeller, the turbine and the stator are arranged in toroidal fluid flow relationship in the usual fashion with the stator being capable of accommodating torque reaction of the hydrokinetic fluid. The multiplied turbine torque that is developed and distributed to shaft 60 may be distributed in turn through a torque multiplying gear system and through a suitable driveline arrangement to the vehicle road wheels. A flexible diaphragm is indicated generally by reference character 98. It includes a hub portion that is received within a retainer 100 having portions situated on either side of the diaphgram. The retainer and the hub of the diaphragm are secured to the turbine hub 58 by the rivets 56 so that the diaphragm 98 rotates in unison with the turbine.

The peripheral portion 102 of the diaphragm 98 has secured thereto a friction element 104 in the form of an annular disc which is carried by a back-up member 106. Back-up member 106 is held in place by rivets 108. Friction element 104 is situated directly adjacent the friction surface 110 formed in the interior of the shell part 146.

The intermediate body portion of the diaphragm 98 is formed with a shape that conforms to the shape of the space between the outer shroud 50 of the turbine 18 and the inner surface of the shell part 46. By preference the diaphragm 98 is formed of rubber or rubber-like material that is reinforced by nylon cords or steel wires, so that it is capable of transmitting driving torque from the impeller to the shaft 60 when the friction disc 104 engages frictionally the surface 110.

Fluid may be supplied to the torus cavity of the converter unit 12 through a passage that is formed in part by the annular space 112 between the sleeve 94 and the sleeve 30. The fluid flow path through the converter circuit is defined also by a passage formed by the annular space 114 between the sleeve 94 and the shaft 60.

The space 114 is in fluid communication with the radial passage 116 formed in shaft 60. This passage in turn is in fluid communication with an axially extending passage 118.

The space between the shell part 46 and the diaphragm 98 is in fluid communication with the passage 118 through radial passages 120.

If desired, pilot tabs 122 can be welded to the outer surface of the shroud 50 so that they register with a cooperating flange 124 formed on the annular back-up member 106. This tends to maintain concentricity under all conditions, and prevents unbalanced forces due to any eccentricity that may develop.

If fluid is supplied to the torus cavity of the converter unit from space 112 and returned through space 114, a pressure differential will tend to exist across the annular space between the friction disc 104 and the friction surface 110. This annular space forms a part of the fluid delivery path and acts as a flow restricting orifice under these conditions. The fluid thus supplied to the circuit passes from the space 112, through the space between the spacer element 74 and the hub 28, through the annular space between hub 28 and shroud 66, through the bladed passage of the impeller, through the annular space between the outer margin of the shroud 50 and the inner surface of the shell part 22, through the flow restricting space between disc 104 and surface 110, through the space between the shell part 46 and the diaphragm 98, through passages 120, through passage 118, through passages 116 and finally through the passage defined by the space 114. The pressure unbalance thus created across the diaphragm 98 causes the diaphragm to shift axially so that the disc 104 is brought into clutching engagement with the surface 110. This directly connects the turbine to the impeller and establishes a direct drive connection from the crankshaft 10 to the turbine shaft 60. Torque is delivered entirely mechanically after the clutch is engaged and the torque converter mechanism is rendered inoperative. No toroidal fluid flow takes place under these lock-up conditions.

The converter feed passages are blocked, of course, but circulation through the converter circuit is not necessary under lock-up conditions since there is no cooling requirement.

To disengage the lock-up clutch, it merely is necessary to reverse the direction of the fluid flow through the torus circuit of the converter unit. If the space 114 now functions as a feed passage and the space 112 is caused to function as a return passage, the fluid flow path through the converter is defined by the passages 116, the passage 118, the passage 120, the space between the shell part 46 and the diaphragm 98, the space between the disc 104 and the surface 110, the annular space between the outer margin of the shroud 50 and the inner surface of the shell part 22, the annular space between the edge of shroud 66 and the hub 28 and finally the passage defined by the space 112. The pressure on one side of the diaphragm 98 is balanced by the pressure on the other side so that the lock-up clutch may become disengaged. The converter thus is capable of acting in a normal manner to multiply hydrokinetically the impeller torque during the torque conversion range. The fluid that is introduced into the torus circuit from the feed passage defined by the space 114 acts as cooling oil for the torus circuit.

During operation under torque with the clutch engaged, the diaphragm 98 is capable of absorbing torsional vibrations in the driveline, thereby providing a smooth power delivery from the driving shaft to the driven shaft. Its flexible characteristics also makes it possible for the friction disc 104 to be shifted axially as the clutch is engaged and disengaged.

The control system for accomplishing the reversal in the flow of the torus fluid is illustrated in FIGURE 2. The passage defined by the annular space 114 is indicated in FIGURE 2 by the reference character 114'. Similarly, the passage defined by the annular space 112 is indicated in FIGURE 2 by the reference character 112'.

The discharge from the impeller driven pump located within cavity 36 is distributed through a passage 126 to a main pressure regulator valve 128. This regulator valve maintains the discharge pressure from the pump at a desired value.

This regulated pressure is utilized by a high speed ratio clutch and a speed reduction brake in a geared torque delivery system. Fluid pressure can be admitted to the brake and the clutch through pressure distributor passages 130 and 132, respectively. Each of these passages communicates with the discharge side of the main regulator valve 128.

A low pressure regulator valve is shown at 134. It receives pressure from the discharge side of the valve 128 through a pressure passage 136. It regulates the pressure in passage 136 and distributes it through passage 138 to a so-called switch valve 140. The low pressure side of the regulator valve 134 communicates with an oil cooler through passage 142. The exhaust port for the regulator valve 134 communicates with the intake side of the impeller driven pump through passage 144.

A compensator valve 146 receives regulated control pressure from a valve 128 through a passage 148. It modulates this pressure in response to the driven speed signal which is distributed to the valve 146 through a passage 150. A suitable power output shaft driven governor valve mechanism 152 is supplied with regulated pressure through passage 154. This same passage delivers pressure from the main regulator 128 to the low pressure regulator valve 134.

The compensator valve 146 also is subjected to a torque demand or torque signal from a throttle valve mechanism, not shown, through a passage 156. Compensator valve 146 responds to this signal and to the governor signal to produce a resultant signal in passage 158. This compensator pressure signal influences the operation of the main regulator valve and the valve 134 to cause an increase in the operating pressure level for any given vehicle speed as the engine torque demand increases. Conversely, a decrease in the regulated pressure level occurs for any given engine throttle setting as the vehicle speed increases.

The switch valve 140 provides selective communication between passage 138 and the passages 112' and 114'. When the switch valve assumes one position, communication is established between passage 138 and passage 112' while passage 114' is brought into communication with an exhaust port 160. When the switch valve assumes the other position, however, communication is established between passage 112' and the exhaust port 160 while passage 114' is brought into communication with passage 138.

When passage 162 is depressurized, communication is established between passage 138 and passage 114'. This causes a radial outward flow through the annular space between disc 104 and the friction surface 110 to cause disengagement of the lock-up clutch. If passage 162 is pressurized, however, the functions of the passages 112' and 114' are interchanged thereby causing lock-up clutch to become engaged under the pressure differential across the diaphragm 98 that is created.

The pressure in passage 116 is established and exhausted by means of a signal valve 164. Control pressure from passage 130 is brought in communication with a feed passage 166 for the valve 164. This communication is established by a so-called "phase" valve 168 whenever the high speed clutch is pressurized. The pressure in the high speed clutch, of course, is sensed by the phase valve by reason of the fluid connection provided by passage 132.

Whenever the high speed ratio clutch is pressurized, the phase valve conditions the signal valve for operation. It thereafter may respond to the governor pressure signal and the torque demand signal to selectively pressurize passage 162. It receives a governor pressure signal from the governor 152 through a passage 170.

When the torque demand signal is insufficient to overcome the opposing influence of the governor pressure signal, passage 162 is exhausted through an exhaust port 172. Also, when the high speed ratio clutch is exhausted, passage 166 is brought into communication with an exhaust port 174.

In FIGURE 3, we have illustrated another converter construction in which the flexible diaphragm clutch arrangement is used to connect selectively an auxiliary bladed impeller member to the main impeller member. The construction in FIGURE 3 includes a crankshaft 176 which is drivably connected to an impeller shell part 178 through a drive plate 180. The periphery of drive plate 180 is bolted by bolts 182 to an outer portion of the shell part 178.

The radially outer margin of shell part 178 is welded or otherwise secured to a secondary shell part 184. The hub 186 of shell part 184 is secured to a supporting sleeve shaft 188.

Bladed impeller blades 190 are secured within the inner surface of the shell part 184. The inner margin of the blades 190 are secured to a toroidal inner shroud 192.

A bladed turbine 194 includes an outer shroud 196, an inner shroud 198 and blades 200 which cooperate with the turbine shrouds to define radial inflow passages.

A bladed stator 202 includes a first shroud 204, a second shroud 206 and stator blades 208 disposed between the shrouds.

Shroud 206 defines a hub having an opening 210 within which is situated an overrunning brake assembly 212. This brake assembly establishes a one-way driving connection between the impeller 202 and a stationary stator sleeve shaft 214. This function is similar to the function of overrunning brake 88 of FIGURE 1.

A flexible diaphragm is shown at 216. This diaphragm corresponds to the diaphragm 98 of the FIGURE 1 construction. The hub for the diaphragm 216 includes a circular retainer member 218 to which the diaphragm 216 is riveted. A thrust washer 220 is situated between member 218 and a hub 222 for the turbine 194. Hub 222 is splined at 224 to a turbine driven shaft 226. Another thrust washer 228 is disposed between the hub of shell part 178 and the member 218. This thrust washer can be formed with radial openings to provide fluid communication between a central passage 230 formed in shaft 226 and a space between diaphragm 216 and the inner surface of shell part 178.

Passage 230 communicates with a passage 232 defined by the annular space between shaft 226 and sleeve shaft 214.

A bladed auxiliary impeller 234 is situated at the flow exit region of the impeller blades 190. It includes an inner shroud 236, and outer shroud 238 and circumferentially spaced blades 240 situated between the shrouds. Shroud 238 is connected by means of a drive shell 242 to the outer periphery of the diaphragm 216. For this purpose, the outer periphery is provided with a circular peripheral disc 244 which is riveted by rivets 246 to the diaphragm 216. An intermediate portion of the diaphragm 216 has secured thereto a friction disc 248 which is situated directly adjacent a friction surface 250 formed on the shell part 178. Rivets 252 can be used to secure the disc 248 to the diaphragm 216.

If the auxiliary impeller 234 becomes clutched to the shell part 178, it will rotate in unison with the impeller blades 190. The passages defined by the blades 240 thus become continuations of the passages defined by the blades 190. The effective blade geometry for the entire impeller assembly thus is altered. The converter mechanism can be conditioned for maximum cruising efficiency when the auxiliary impeller 234 rotates in unison with the impeller blades 190. On the other hand, if the auxiliary impeller 234 is declutched from the main impeller, it will be allowed to float freely within the torus circuit. Thus, the effective blade exit geometry for the impeller assembly is made equal to the exit geometry for the main impeller blades 190 themselves. This results in an increase in the torque ratio at lower speed ratios and an accompanying increase in the engine speed at low speed ratios for any given input torque. Thus the converter can be conditioned for operation in each of two performance ranges depending upon whether high torque ratio performance operation is desired or maximum efficiency cruising operation is desired.

The auxiliary impeller 234 may be connected drivably to the main impeller by the friction clutch structure shown in part at 248 and 250. The disc 248 can be brought into frictional engagement with the surface 250 in response to the pressure in the torus circuit of the converter. When fluid is applied to the converter through passage 232, through passage 230, through the radial passages in the thrust washer 228, through the space between diaphragm 216 and the inner surface of the shell part 178 and through the space between drive shell 242 and the shell part 184, the pressure forces acting upon the diaphragm 216 are substantially balanced. Under these conditions the converter fluid is returned through the passage 254 which is defined by the annular space between sleeve 188 and sleeve 214.

The diaphragm 216, like the diaphragm 98 of FIGURE 1, may be made of rubberized reinforced material. It will permit engagement and release of the clutch shown in part at 248 and 250 without the necessity for employing sliding splines or keyways. The resulting construction is a highly reliable, yet inexpensive, clutch arrangement for controlling the action of the auxiliary impeller 234.

For a more particular description of the control valve system capable of controlling the direction of flow through the converter torus circuit of FIGURE 3, reference should be made to the co-pending application of Martin G. Gabriel, Serial No. 253,413. For a particular description of the control system shown schematically in FIGURE 2, reference may be made to the co-pending application of Norman T. General and Po-lung Liang, Serial No. 259,272.

Having thus described preferred embodiments of our invention, what we claim and desire to secure by U.S. Letters Patent is:

1. In a hydrokinetic power transmission mechanism, a hydrokinetic unit having bladed members situated in a closed toroidal fluid flow circuit, one member being connected to a driving member, another member being connected to a driven member, friction clutch means for connecting two members of said hydrokinetic unit together for rotation in unison, said clutch means including a first friction portion carried by one member, a flexible torsionally yieldable diaphragm having one peripheral portion connected to another member, and a second friction portion connected to the other peripheral portion of said diaphragm, said friction portions being situated in close proximity, one side of said diaphragm being exposed to the pressure of the fluid in said circuit and responding thereto to establish a frictional driving connection between said one member and said other member fluid flow passage means for feeding fluid to said circuit and delivering fluid from said circuit, said passage means extending radially between said friction portions, and means for reversing the direction of fluid flow past said friction portions to engage and disengage said friction clutch means.

2. A hydrokinetic power transmission mechanism comprising an impeller and a turbine situated in toroidal fluid flow relationship in a common torus circuit, said impeller being connected to a driving member, said turbine being connected to a driven member, a flexible, torsionally yieldable diaphragm having one peripheral portion thereof connected to said turbine member, a friction clutch element connected to the other peripheral portion of the diaphragm, a friction surface carried by said impeller, means for subjecting one side of said diaphragm to the fluid pressure that exists in said torus circuit to establish a frictional driving connection between said impeller and said turbine, fluid flow passage means for feeding fluid to said circuit and delivering fluid from said circuit, said passage means extending radially across said friction surface, and means for reversing the direction of flow across said friction surface to establish and disestablish said driving connection.

3. A hydrokinetic power transmission mechanism comprising a bladed turbine and a bladed impeller situated in toroidal fluid flow circuit, said impeller being connected to a driving member, said turbine being connected to a driven member, a flexible, torsionally yieldable, rubberized member in the form of a diaphragm, the inner peripheral portion of said diaphragm being connected to said turbine, a friction clutch element connected to the outer peripheral portion of said diaphragm, a friction surface carried by said impeller adjacent said friction clutch element, fluid flow passage means for circulating fluid through said torus circuit, said passage means being defined in part by an annular space between said friction element and said friction surface, said friction element being urged out of clutching engagement with respect to said friction surface as the converter supply fluid passes across said friction element in a radially outward direction and returns from said torus circuit through a low pressure flow return passage, said friction element being urged into frictional engagement with said friction surface when converter fluid is supplied through said flow return passage and said radial outward flow is interrupted.

4. In a hydrokinetic power transmission mechanism, a hydrokinetic unit having bladed members situated in a closed toroidal fluid flow circuit, one member being connected to a driving member, another member being connected to a driven member, friction clutch means for connecting two members of said hydrokinetic unit together for rotation in unison, said clutch means including a first friction portion carried by one member, a flexible, rubberized diaphragm having one peripheral portion connected to another member, and a second friction portion connected to the other peripheral portion of said diaphragm, said friction portions being situated in close proximity, one side of said diaphragm being exposed to the pressure of the fluid in said circuit and responding thereto to establish a frictional driving connection between said one member and said other member, said diaphragm being capable of transmitting torque from said driving member to said driven member, when said friction portions assume a clutching condition, one periphery of said diaphragm being torsionally yieldable with respect to the other periphery whereby torsional vibration may be absorbed to cushion the transmission of torque from said driving member to said driven member, fluid flow passage means for feeding fluid to said circuit and delivering fluid from said circuit, said passage means extending radially between said friction portions, and means for reversing the direction of flow across said friction portions to establish and disestablish said frictional driving connection.

5. A hydrokinetic power transmission mechanism comprising an impeller and a turbine situated in toroidal fluid flow relationship in a common torus circuit, said impeller being connected to a driving member, said turbine being connected to a driven member, a flexible, rubberized diaphragm having one peripheral portion thereof connected to said turbine member, a friction clutch element connected to the other peripheral portion of the diaphragm, a friction surface carried by said impeller, means for subjecting one side of said diaphragm to the fluid pressure that exists in said torus circuit to establish a frictional driving connection between said impellers and said turbines, said diaphragm being capable of transmitting torque from said driving member to said driven member when said friction element assumes a clutching position, one periphery of said diaphragm being torsionally yieldable with respect to the other periphery whereby torsional vibration may be absorbed to cushion the transmission of torque from said driving member to said driven member, fluid flow passage means for feeding fluid to said circuit and delivering fluid from said circuit, said passage means extending radially across said friction surfaces, and means for reversing the direction of flow across said surfaces to establish and disestablish said driving connection.

6. A hydrokinetic power transmission mechanism comprising a bladed turbine and a bladed impeller situated in toroidal fluid flow circuit, said impeller being connected to a driving member, said turbine being connected to a driven member, a flexible member in the form of a rubberized diaphragm, the inner peripheral portion of said diaphragm being connected to said turbine, a friction clutch element connected to the outer peripheral portion of said diaphragm, a friction surface carried by said impeller adjacent said friction clutch element, fluid flow passage means for circulating fluid through said torus circuit, said passage means being defined in part by an annular space between said friction element and said friction surface, said friction element being urged out of clutching engagement with respect to said friction surface as the converter supply fluid passes across said friction element in a radially outward direction and returns from said torus circuit through a low pressure flow return passage, said friction element being urged into frictional engagement with said friction surface when converter fluid is supplied through said flow return passage and said radial outward flow is interrupted, said diaphragm being capable of transmitting torque from said driving member to said driven member when said friction element assumes a clutching position, one periphery of said diaphragm being torsionally yieldable with respect to the other periphery whereby torsional vibration may be absorbed to cushion the transmission of torque from said driving member to said driven member.

7. In a hydrokinetic power transmission mechanism, a hydrokinetic unit having a primary impeller member, a secondary impeller member, a turbine member and a stator member situated in toroidal fluid flow relationship in a common torus circuit, said primary impeller member being connected to a driving member, said turbine member being connected to a driven member, friction clutch means for connecting together said primary impeller member and said secondary impeller member for rotation in unison, said primary impeller member including an impeller shell that encloses said turbine member, said clutch means including a first friction portion carried by said impeller shell, a flexible, torsionally yieldable diaphragm extending in a generally radial direction between said impeller shell and said turbine member, said diaphragm having a peripheral portion thereof connected to said secondary impeller member, a second friction portion of said clutch means being carried by said peripheral portion of said diaphragm, said friction portions being situated in close proximity, one side of said diaphragm being exposed to the pressure of the fluid in said circuit and responding thereto to establish a frictional driving connection between said one member and said other member, said diaphragm and the adjacent portion of said impeller shell defining a fluid cavity that is adapted to communicate with said fluid flow circuit.

8. In a hydrokinetic power transmission mechanism, a hydrokinetic unit having a bladed primary impeller member, a bladed secondary impeller member, a bladed turbine member, and a bladed stator member situated in toroidal fluid flow relationship in a common torus circuit, said primary impeller member being connected to a driving member, said turbine member being connected to a driven member, an impeller shell forming a part of said primary impeller member and enclosing said turbine member, friction clutch means for connecting together said impeller shell and said secondary impeller member for rotation in unison, said clutch means including a first friction portion carried by said impeller shell, a flexible rubberized diaphragm extending radially between said turbine member and said impeller shell, said diaphragm being connected to said secondary impeller member, a second friction portion carried by said diaphragm adjacent said first friction portion, said friction portions being situated in close proximity, one side of said diaphragm being exposed to the pressure of the fluid in said circuit and responding thereto to establish a frictional driving connection between said primary impeller member and said secondary impeller member, fluid flow passage means for feeding fluid to said circuit and delivering fluid from said circuit, said passage means extending radially between said friction portions, and means for reversing the direction of flow across said friction portions to establish and disestablish said driving connection.

References Cited by the Examiner
UNITED STATES PATENTS

| 2,350,810 | 6/1944 | Pentz | 192—3.2 |
| 2,404,657 | 7/1946 | Roberts et al. | 192—3.2 |
| 2,818,949 | 1/1958 | Giffen | 192—88 |
| 2,824,631 | 2/1958 | De Lorean | 192—3.2 |
| 3,151,717 | 10/1964 | Kaptur et al. | 192—3.2 |

DAVID J. WILLIAMOWSKY, *Primary Examiner.*